United States Patent
Dobson et al.

(10) Patent No.: US 10,429,004 B2
(45) Date of Patent: Oct. 1, 2019

(54) ACCESSORY FOR ELECTRONIC DEVICE

(71) Applicant: CASE-MATE, INC., Atlanta, GA (US)

(72) Inventors: Cole David Dobson, Smyrna, GA (US); Saumil Chetan Mody, Atlanta, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 16/287,424

(22) Filed: Feb. 27, 2019

(65) Prior Publication Data
US 2019/0264867 A1    Aug. 29, 2019

Related U.S. Application Data

(60) Provisional application No. 62/636,646, filed on Feb. 28, 2018.

(51) Int. Cl.
| F16M 13/06 | (2006.01) |
| F16M 13/02 | (2006.01) |
| F16B 47/00 | (2006.01) |
| F16M 13/04 | (2006.01) |

(52) U.S. Cl.
CPC .............. *F16M 13/06* (2013.01); *F16B 47/00* (2013.01); *F16M 13/022* (2013.01); *F16M 13/04* (2013.01); *A45F 2200/0516* (2013.01)

(58) Field of Classification Search
CPC ..... A45F 2200/0516; A45F 2200/0525; F16M 13/06; F16M 13/022; F16M 13/04; F16B 47/00

USPC ................... 294/25, 142; D14/217, 251, 252
See application file for complete search history.

(56) References Cited

U.S. PATENT DOCUMENTS

| D682,283 S | * | 5/2013 | Tak ............................. D14/447 |
| 8,672,374 B1 | * | 3/2014 | Webber ................ F16M 11/041 224/217 |
| 9,486,910 B2 | * | 11/2016 | Stevens ................ F16M 11/041 |
| D805,057 S | * | 12/2017 | Cass ............................ D14/217 |
| 2012/0118770 A1 | * | 5/2012 | Valls ...................... F16M 11/10 206/320 |
| 2013/0187020 A1 | * | 7/2013 | Trotsky .................. F16M 11/10 248/309.3 |
| 2015/0122852 A1 | * | 5/2015 | Feng ........................ A45F 5/00 224/191 |
| 2015/0283469 A1 | * | 10/2015 | Barnes ................... A63H 3/003 446/369 |
| 2015/0296064 A1 | * | 10/2015 | Ishida .................. F16M 11/041 248/683 |

FOREIGN PATENT DOCUMENTS

JP          3176522 U   *  6/2012

* cited by examiner

*Primary Examiner* — Dean J Kramer
(74) *Attorney, Agent, or Firm* — Gardner Groff & Greenwald, PC

(57) ABSTRACT

An accessory for a handheld electronic device generally including attachment portion for attaching the accessory to the device and a stand and gripping portion for holding the portable electronic device on a support surface or for gripping by a user. The attachment portion can take the form of a suction cup or other removable fastening mechanism, and the stand and gripping portion can be shaped to resemble a character or object such as a balloon dog.

25 Claims, 3 Drawing Sheets

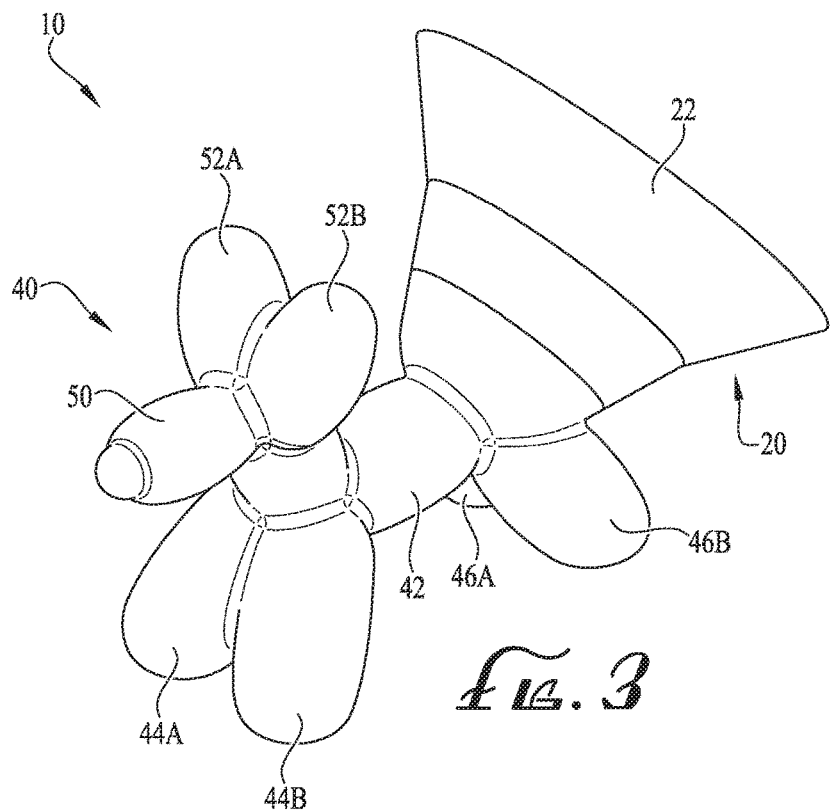
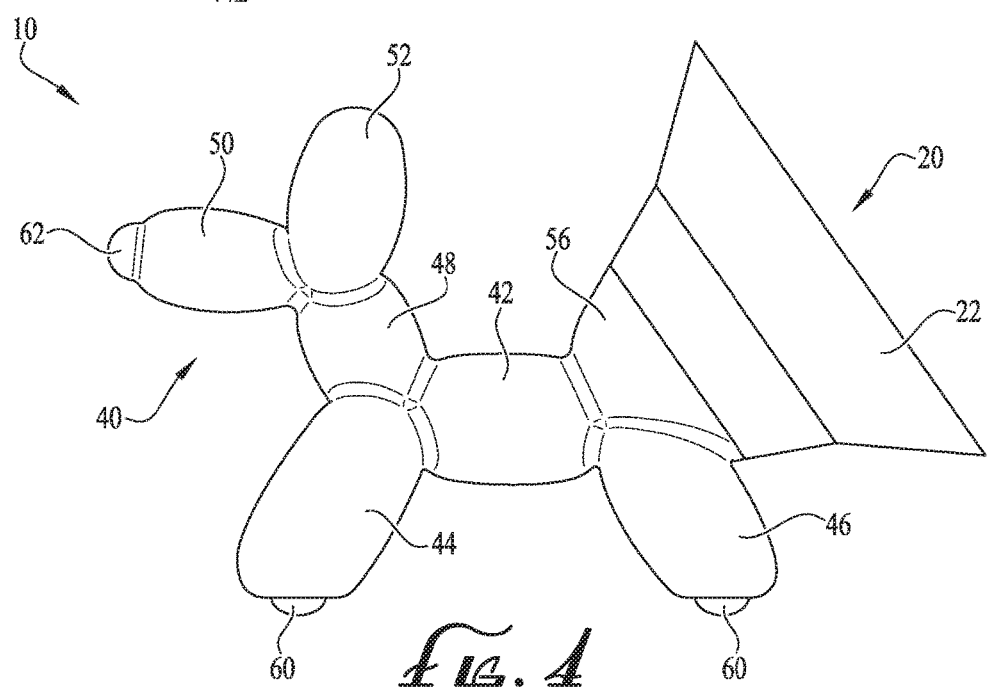

ACCESSORY FOR ELECTRONIC DEVICE

CROSS-REFERENCE TO RELATED APPLICATION

This application claims the benefit of U.S. Provisional Patent Application Ser. No. 62/636,646 filed Feb. 28, 2018, the entirety of which is hereby incorporated herein by reference for all purposes.

TECHNICAL FIELD

The present invention relates generally to the field of accessories for mobile electronic devices, and more particularly to a detachable gripping and stand accessory for a mobile electronic device.

BACKGROUND

Increasingly, mobile electronic devices such as mobile phones are used to watch video content. It is helpful to support the mobile device in an angled position on a support surface to allow the user to watch the video content hands-free. Stands that are permanently attached to the mobile device or mobile device case increase the dimensions of the mobile device. This is particularly disadvantageous for mobile devices which are often carried by users in their pockets or small bags, or when it is desired to use the device in other modes. It may also be advantageous to provide a gripping accessory to assist users in holding and operating portable devices. Accordingly, it can be seen that needs exist for a stand and gripping accessory for a portable electronic device that can be releasably attached to the device. Such an accessory allows the accessory to be removed when not in use, thereby not increasing the overall dimensions of the device or interfering with other modes of use.

It is to the provision of an accessory for an electronic device meeting these and other needs that the present invention is primarily directed.

SUMMARY

In example embodiments, the present invention provides an accessory for an electronic device generally including an attachment portion for attaching the accessory to a portable electronic device and a stand and/or gripping portion for holding the portable electronic device against a support surface or in a hand-held mode of use. The attachment portion can be a suction cup or other removable fastening mechanism. The stand and gripping portion can be shaped to resemble a character or object. In example embodiments, the stand portion is molded to resemble a balloon dog.

In one aspect, the present invention relates to an accessory for a portable electronic device comprising an attachment portion releasably attachable to the portable electronic device and a stand portion configured to resemble a character or object. The stand portion is configured to support the portable electronic device against a support surface.

In another aspect, the invention relates to an accessory for a portable electronic device. The accessory preferably includes an attachment portion configured for attachment to the portable electronic device or a case for the portable electronic device, and a stand and gripping portion extending from the attachment portion. The stand and gripping portion is preferably configured to resemble a character or object, such as for example a balloon dog. The stand and gripping portion supports the portable electronic device against a support surface in a first mode of use, and allows the user to grip and hold the device in a second mode of use.

In still another aspect, the invention relates to an accessory for a portable electronic device. The accessory preferably includes a stand and gripping portion having a body portion, a pair of front legs extending from a forward end of the body portion, a pair of rear legs extending from a rear end of the body portion, a neck portion extending from the forward end of the body portion, and a head portion extending from the neck portion. The accessory preferably also includes an attachment portion including at least one suction cup extending from a tail portion adjacent the rear end of the body portion.

In another aspect, the invention relates to an accessory for a portable electronic device. The accessory preferably includes a stand and gripping portion having a medial body portion, at least one front leg extending from a forward end of the medial body portion, and at least one rear leg extending from a rear end of the medial body portion. The medial body portion preferably has a length of about 0.75 cm-3.0 cm measured between the points of attachment of the at least one front leg and the at least one rear leg to the medial body portion. The accessory preferably also includes an attachment portion extending from the stand and gripping portion for coupling to the portable electronic device.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 3 is a perspective view of the accessory for an electronic device shown in FIG. 1.

FIG. 4 is a side view of the accessory for an electronic device shown in FIG. 1.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
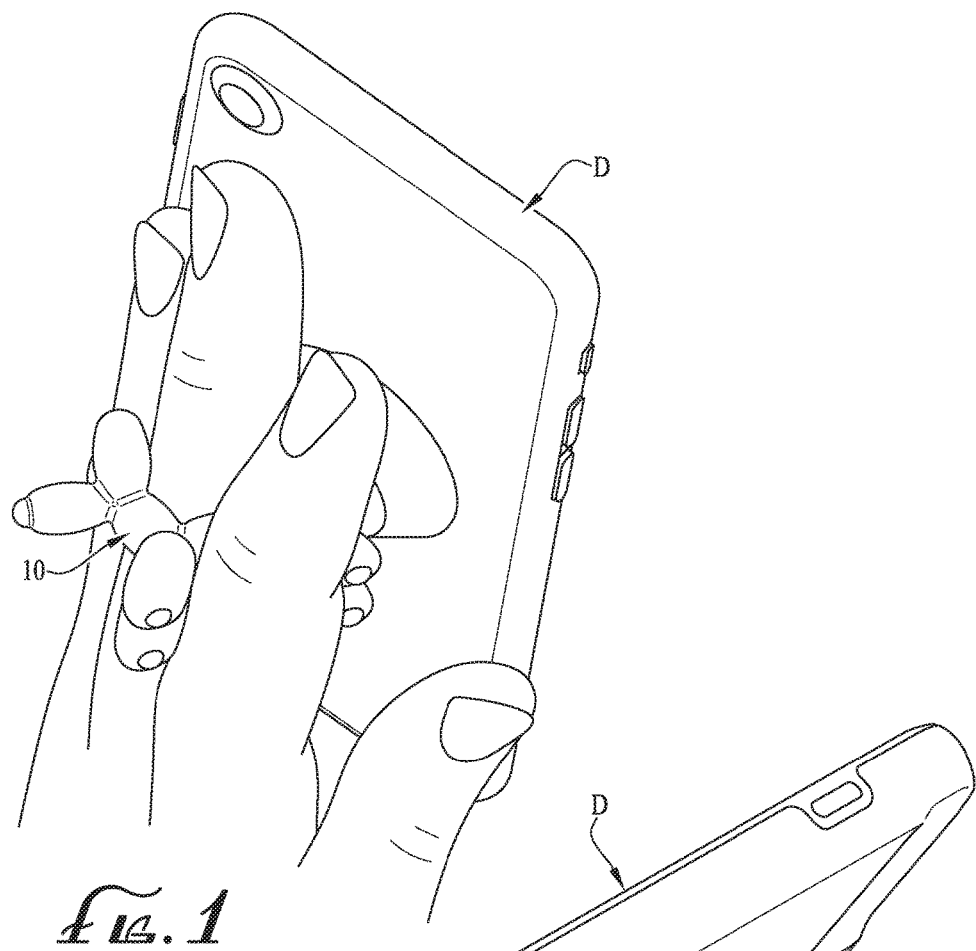
FIG. 1 is a perspective view of an accessory for an electronic device in a hand-held mode of use according to an example embodiment of the present invention.
Figure 2:
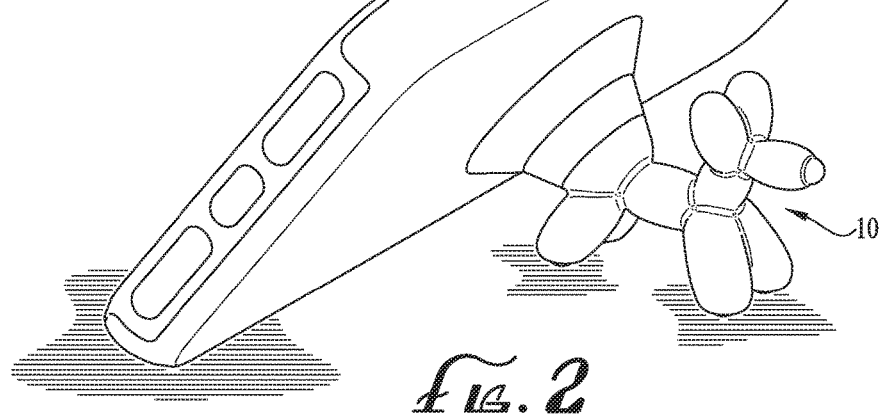
FIG. 2 is a perspective view of an accessory for an electronic device in a stand-support mode of use according to an example embodiment of the present invention.

With reference now to the drawing figures, wherein like reference numbers represent corresponding parts throughout the several views, FIGS. 1-5 show an accessory 10 for an electronic or other handheld or portable device D according to an example embodiment of the invention. The accessory 10 generally includes an attachment portion 20 for attaching the accessory to a portable electronic device and a stand and gripping portion 40 for holding the device D in a hand-held or gripped mode of use (FIG. 1), and/or for supporting the device D in a stand-supported mode of use upon a support surface (FIG. 2). The device D is depicted as a mobile phone or smart phone device. In other embodiments, the device D can be a tablet computer, e-reader, mp3 player, or other portable electronic device or other portable or handheld device.

In example embodiments, the attachment portion 20 is configured to releasably attach the accessory 10 to an attachment surface or portion of the device D. In other embodiments, the accessory can be releasably mounted to a protective and/or ornamental case which holds the device D. In alternate embodiments, the attachment portion 20 is configured to attach the accessory 10 directly or indirectly to the device D, in a temporary or detachable (hand-removable), semi-permanent (tool-removable), or permanent (not easily removable without damage to the device or the accessory) fashion. In the depicted embodiment, the attachment portion 20 is a soft suction cup 22 configured to be pushed against a surface, usually the back surface, of the portable electronic device D. In example embodiments, the suction cup 22 is formed from a soft plastic such as polyvinyl chloride (PVC), thermoplastic polyurethane (TCU), silicone, nitrile, viton, vinyl, urethane or another soft plastic. In other embodiments, one or more suction cups or other releasable, semi-permanent, or permanent attachment means or mechanisms can be used to secure the accessory to the portable device, such as for example one or more snap fasteners, magnetic couplings, hook-and-loop fastener materials, adhesive, clips, screws, rivets, sliding fasteners or other attachment means.

The stand and gripping portion 40 is configured to project outwardly and extend away from the attachment surface of the portable electronic device D when the accessory 10 is attached to the device. The stand and gripping portion 40 is configured and dimensioned to support the portable electronic device D upon a support surface in a stand mode of use as shown in FIG. 2, without the user needing to hold or support the device. In example embodiments, the stand and gripping portion 40 can support the mobile device in a landscape or horizontal orientation as shown and/or in a portrait or vertical orientation. The stand and gripping portion 40 can preferably also provide a grip for a person to hold the mobile device D in a hand-held mode of use as shown in FIG. 1.

In example embodiments, the stand and gripping portion 40 is decoratively shaped to form an object or character. In the depicted embodiment, the stand and gripping portion 40 is shaped as a balloon dog (i.e., resembling an elongate novelty balloon twisted into the shape of a toy dog or other four-legged animal). The attachment portion 20 is attached to the rear or tail end of the balloon dog. The balloon dog stand and gripping portion 40 optionally includes four legs configured to rest on the support surface and support the device D in a stable and generally upright or inclined orientation for allowing the user to view the device screen. In other embodiments, the accessory 10 can take the form of other novelty balloon shapes, toys, animals, characters and objects. In example embodiments, the stand and gripping portion 40 can be formed from a substantially rigid material such as a rigid plastic. Example materials include polycarbonate (PC), acrylonitrile butadiene styrene (ABS), polyethylene or similar rigid plastics. In alternate embodiments, the stand and gripping portion 40 can be formed from metal, wood, and/or other substantially rigid material(s).

In example embodiments, the stand and gripping portion 40 of the accessory 10 comprises an interlinked assembly or body having or defining a plurality of generally cylindrical, ovoid, or tubular segments with radiused or rounded ends. For example, in the depicted embodiment, the stand and gripping portion 40 comprises an elongate medial or body portion 42, a pair of front legs 44 extending downwardly and at an oblique angle from a forward end of the body portion, a pair of rear legs 46 extending downwardly and at an oblique angle from a rear end of the body portion, a neck portion 48 extending upwardly and at an oblique angle from the forward end of the body portion, and a head portion 50 extending outwardly from the neck. Optionally, a pair of ear portions 52 extend outwardly from the head portion 50. A tail portion 56 at the rear end of the body 42 forms an attachment portion for coupling with or receiving the attachment portion 20, which may comprise a suction cup, magnetic or adhesive mounting pad adhesive surface, and/or other means for detachable or permanent attachment to an electronic device D or to a case into which the electronic device may be installed and housed. One or more of the body, legs, neck, head, ears and/or other portions of the accessory preferably comprise generally rounded cylindrical bulbous bodies configured to have the shape of segments of an elongate tubular inflated novelty balloon of the sort commonly twisted by entertainers into the shape of a dog or other balloon animal or object.

The stand and gripping portion 40 can also include a non-skid or non-slip material attached to the portion of stand configured to rest on the support surface to prevent the stand from sliding along the support surface. In the depicted embodiment, the balloon dog includes non-skid material in the form of feet 60 attached to each of the four legs. Optionally, a non-skid nose pad 62 may also be provided at the distal end of the head segment 50. The non-skid material is generally formed from a soft plastic material such as, for example, silicon, polyvinyl chloride (PVC), or thermoplastic polyurethane (TPU), from a natural or synthetic rubber, cork, or other soft, non-marring material with a high coefficient of friction. The non-skid portions 60, 62 can be formed separately from the stand and gripping portion 40, for example by injection or compression molding, or can be co-molded or overmolded therewith. The non-skid material can be attached to the bottom of the stand portion with an adhesive or another attachment means. In the depicted embodiment, each leg 44 of the balloon dog includes a bore hole in its distal end for receiving the non-skid foot 60. The non-skid material is press fitted into the bore holes and optionally permanently secured using an adhesive. The bore holes are dimensioned such that a portion of the non-skid material extends beyond the bore holes such that the non-skid material rests on the support surface.

Figure 5:
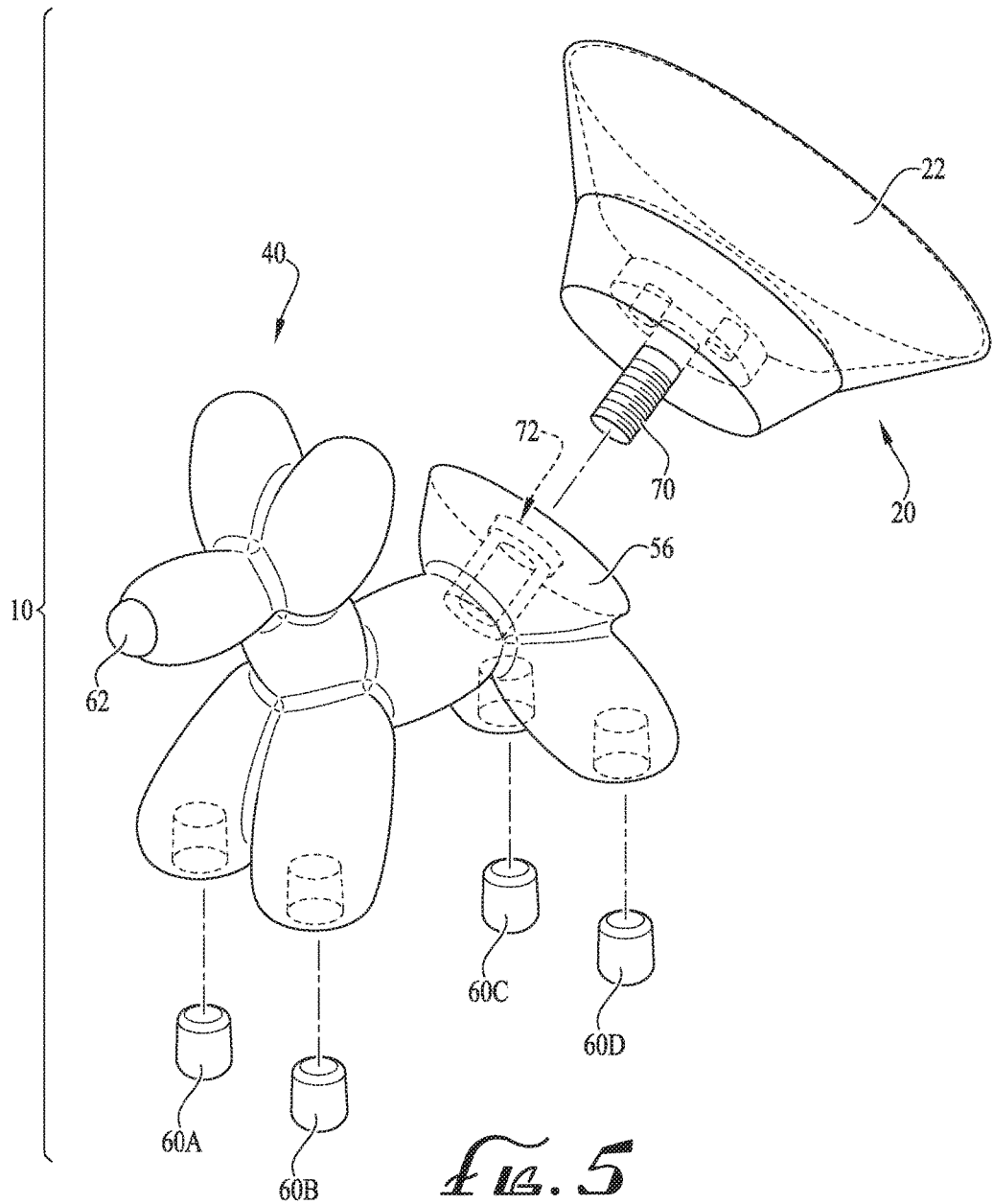
FIG. 5 is an exploded assembly view of the accessory for an electronic device shown in FIG. 1.

The attachment portion 20 and the stand and gripping portion 40 of the accessory can be coupled to one another using a threaded fastener, adhesive, or other attachment means. As shown in FIG. 5, in the depicted embodiment, the attachment portion 20 comprises a threaded stud or bolt 70 that is insert-molded within or otherwise affixed to the suction cup 22. The stand and gripping portion 40 can include a cooperating threaded nut or threaded receiver opening 72 that is molded or otherwise formed within the body at or adjacent the tail portion 56. Alternatively, the configuration may be reversed, with the male threaded stud on the stand and gripping portion 40 and the female threaded opening in the attachment portion 20. The male and female coupling elements 70, 72 can be formed from metal including steel or brass or can be formed of plastic or another rigid material. In other embodiments, the attachment portion 20 can be integrally formed with the stand and gripping portion 40, or can be attached by any suitable detachable, permanent or semi-permanent fastening method or means.

In example methods or modes of use, the accessory allows a user to grip and hold the electronic device by placing the body or other portion between his or her fingers (see FIG. 1) in a handheld method or mode of use, and/or to use the accessory as a stand for supporting the electronic device in a generally upright or angled position on a table or other support surface without the user holding or touching the device in a support stand method or mode of use (see FIG. 2). Optionally, a rotational, pivotal or swivel coupling can be provided between the attachment portion 20 and the stand and gripping portion 40, allowing angular or rotational adjustment of the gripping or stand position, for example enabling the user to easily switch between a portrait and a landscape orientation of the device D. In example embodiments, and as seen with reference to FIGS. 2 and 4, the suction cup 22 is oriented at an oblique acute angle with respect to a support plane defined by the four feet 60, to allow the device D to be supported at a convenient viewing angle relative to a horizontal support surface in the support stand mode of use. Additionally, in example embodiments, the medial body portion 42 of the stand and gripping portion 40 has a length of about 0.75 cm-3.0 cm, or in further example embodiments about 1.0 cm-1.5 cm, or in particular example embodiments about 1.25 cm, as measured between the points of attachment of the front and rear legs 44, 46 to the body portion and between the points of attachment of the neck and tail portions 48, 56 to the body portion, thereby allowing comfortable gripping between an adult user's forefinger and middle finger as shown in FIG. 1 in the handheld mode of use. The front and rear legs 44, 46 and the neck and tail portions 48, 56 optionally taper outwardly and away from one other in a generally symmetric paired arrangement, forming a saddle-shaped or hourglass-shaped profile configured to be comfortably gripped by users of varying finger thickness.

While the invention has been described with reference to example embodiments, it will be understood by those skilled in the art that a variety of modifications, additions and deletions are within the scope of the invention, as defined by the following claims.

What is claimed is:

1. An accessory for a portable electronic device comprising:
    a stand and gripping portion comprising a body portion, a pair of front legs extending from a forward end of the body portion, a pair of rear legs extending from a rear end of the body portion, a neck portion extending from the forward end of the body portion, and a head portion extending from the neck portion; and
    an attachment portion comprising at least one suction cup extending from a tail portion adjacent the rear end of the body portion.

2. The accessory of claim 1, wherein the stand and gripping portion is configured to have the appearance of a balloon dog.

3. The accessory of claim 1, further comprising non-slip feet at distal ends of each of the pair of front legs and the pair of rear legs.

4. The accessory of claim 1, wherein the attachment portion is attached to the stand and gripping portion by a threaded coupling.

5. The accessory of claim 1, wherein the stand and gripping portion comprises an integrally molded unitary component.

6. The accessory of claim 1, wherein the suction cup is oriented at an oblique acute angle with respect to a support plane defined by support feet at distal ends of the front and rear legs.

7. The accessory of claim 1, further comprising a pair of ear portions extending from the head portion.

8. The accessory of claim 1, wherein the body portion of the stand and gripping portion has a length of about 0.75 cm-3.0 cm measured between the points of attachment of the pair of front legs and the pair of rear legs to the body portion.

9. An accessory for a portable electronic device comprising:
    a stand and gripping portion comprising a medial body portion, at least one front leg extending from a forward end of the medial body portion, and at least one rear leg extending from a rear end of the medial body portion, wherein the medial body portion has a length of about 0.75 cm-3.0 cm measured between the points of attachment of the at least one front leg and the at least one rear leg to the medial body portion; and
    an attachment portion extending from the stand and gripping portion for coupling to the portable electronic device; and
    wherein the at least one front leg and the at least one rear leg taper outwardly and away from one another.

10. The accessory of claim 9, wherein the stand and gripping portion comprises a pair of front legs extending from the forward end of the medial body portion, a pair of rear legs extending from the rear end of the medial body portion, a neck portion extending from the forward end of the medial body portion, and a head portion extending from the neck portion.

11. The accessory of claim 9, further comprising non-slip feet at distal ends of each of the at least one front leg and the at least one rear leg.

12. The accessory of claim 9, wherein the stand and gripping portion is configured to have the appearance of a balloon dog.

13. The accessory of claim 9, wherein the attachment portion comprises at least one suction cup extending from a tail portion adjacent the rear end of the medial body portion.

14. The accessory of claim 13, wherein the attachment portion is attached to the stand and gripping portion by a threaded coupling.

15. An accessory for a portable electronic device comprising:
    a stand and gripping portion comprising a medial body portion, at least one front leg extending from a forward end of the medial body portion, and at least one rear leg extending from a rear end of the medial body portion, wherein the medial body portion has a length of about 0.75 cm-3.0 cm measured between the points of attachment of the at least one front leg and the at least one rear leg to the medial body portion; and an attachment portion extending from the stand and gripping portion for coupling to the portable electronic device; and wherein the stand and gripping portion comprises a pair of front legs extending from the forward end of the medial body portion, a pair of rear legs extending from the rear end of the medial body portion, a neck portion extending from the forward end of the medial body portion, and a head portion extending from the neck portion; and further comprising non-slip feet at distal ends of each of the pair of front legs and the pair of rear legs.

16. The accessory of claim 15, wherein the stand and gripping portion is configured to have the appearance of a balloon dog.

17. The accessory of claim 15, wherein the pair of front legs and the pair of rear legs taper outwardly and away from one another.

18. The accessory of claim 15, wherein the attachment portion comprises at least one suction cup extending from a tail portion adjacent the rear end of the medial body portion.

19. The accessory of claim 18, wherein the attachment portion is attached to the stand and gripping portion by a threaded coupling.

20. An accessory for a portable electronic device comprising:

a stand and gripping portion comprising a medial body portion, at least one front leg extending from a forward end of the medial body portion, and at least one rear leg extending from a rear end of the medial body portion, wherein the medial body portion has a length of about 0.75 cm-3.0 cm measured between the points of attachment of the at least one front leg and the at least one rear leg to the medial body portion; and an attachment portion extending from the stand and gripping portion for coupling to the portable electronic device; and wherein the attachment portion comprises at least one suction cup extending from a tail portion adjacent the rear end of the medial body portion.

21. The accessory of claim 20, wherein the attachment portion is attached to the stand and gripping portion by a threaded coupling.

22. The accessory of claim 20, wherein the stand and gripping portion comprises a pair of front legs extending from the forward end of the medial body portion, a pair of rear legs extending from the rear end of the medial body portion, a neck portion extending from the forward end of the medial body portion, and a head portion extending from the neck portion.

23. The accessory of claim 20, wherein the at least one front leg and the at least one rear leg taper outwardly and away from one another.

24. The accessory of claim 20, further comprising non-slip feet at distal ends of each of the at least one front leg and the at least one rear leg.

25. The accessory of claim 20, wherein the stand and gripping portion is configured to have the appearance of a balloon dog.

* * * * *